United States Patent
Kleve et al.

(10) Patent No.: US 9,251,694 B2
(45) Date of Patent: Feb. 2, 2016

(54) VEHICLE SYSTEM PASSIVE NOTIFICATION USING REMOTE DEVICE

(71) Applicant: Ford Global Technologies, LLC, Dearborn, MI (US)

(72) Inventors: Robert Bruce Kleve, Dearborn, MI (US); John Robert Van Wiemeersch, Novi, MI (US); Thomas Lee Miller, Ann Arbor, MI (US); Steven Yellin Schondorf, Dearborn, MI (US); Karl Douglas Vandivier, Belleville, MI (US); Paul Aldighieri, Gross Pointe Farms, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/031,168

(22) Filed: Sep. 19, 2013

(65) Prior Publication Data
US 2014/0015696 A1 Jan. 16, 2014

Related U.S. Application Data

(63) Continuation of application No. 12/571,517, filed on Oct. 1, 2009, now Pat. No. 8,558,690.

(51) Int. Cl.
*G08G 1/123* (2006.01)
*G08B 25/00* (2006.01)
*H04M 11/04* (2006.01)
*B60C 23/04* (2006.01)

(52) U.S. Cl.
CPC ............ *G08B 25/00* (2013.01); *B60C 23/0479* (2013.01); *H04M 11/04* (2013.01)

(58) Field of Classification Search
CPC .......... B60W 2550/402; B60W 10/06; B60W 2720/106; B60W 50/029; B60W 2530/14; B60W 10/196; B60W 2050/046; B60W 30/18136; B60W 50/0205; B60W 50/045; B60W 50/08; B60W 10/08; B60W 10/11; B60W 2050/006
USPC ........ 340/988, 539.11, 576, 435, 686.1, 5.61, 340/539.1, 990, 989, 995, 994, 998, 825.69, 340/426.35, 5.62, 5.72
See application file for complete search history.

(56) References Cited

U.S. PATENT DOCUMENTS

| | | | |
|---|---|---|---|
| 4,797,671 A | 1/1989 | Toal, Jr. | |
| 4,804,937 A | 2/1989 | Barbiaux | |

(Continued)

FOREIGN PATENT DOCUMENTS

| | | |
|---|---|---|
| CN | 1305909 A | 8/2001 |
| CN | 101537823 A | 9/2009 |
| DE | 10141439 | 2/2003 |
| DE | 10225787 A1 | 12/2003 |
| JP | 2005220635 | 8/2005 |
| WO | 2006075533 | 7/2006 |

OTHER PUBLICATIONS

Vehicle monitoring system, GPS vehicle monitoring system. Vehicle tracking system. http://www.guardmagic.com/, May 22, 2009.

(Continued)

*Primary Examiner* — Daniel Previl
(74) *Attorney, Agent, or Firm* — Jennifer M. Stec; Brooks Kushman P.C.

(57) ABSTRACT

A method of vehicle monitoring includes monitoring one or more vehicle safety systems while a vehicle is in operation to detect an unsafe condition. The method also includes sending an alert to a handheld device if an unsafe condition is detected.

18 Claims, 13 Drawing Sheets

(56) References Cited

U.S. PATENT DOCUMENTS

| | | | |
|---|---|---|---|
| 5,355,511 A | 10/1994 | Hatano et al. | |
| 5,432,841 A | 7/1995 | Rimer | |
| 5,633,484 A | 5/1997 | Zancho et al. | |
| 5,654,686 A | 8/1997 | Geschke et al. | |
| 5,732,074 A | 3/1998 | Spaur et al. | |
| 5,758,300 A | 5/1998 | Abe | |
| 5,889,468 A | 3/1999 | Banga | |
| 5,942,979 A * | 8/1999 | Luppino | 340/576 |
| 5,943,206 A | 8/1999 | Crayford | |
| 5,963,129 A | 10/1999 | Warner | |
| 5,986,543 A | 11/1999 | Johnson | |
| 5,993,397 A | 11/1999 | Branson | |
| 6,025,777 A | 2/2000 | Fuller et al. | |
| 6,037,676 A | 3/2000 | Foree | |
| 6,067,009 A | 5/2000 | Hozuka et al. | |
| 6,104,931 A | 8/2000 | Havinis et al. | |
| 6,292,095 B1 | 9/2001 | Fuller et al. | |
| 6,295,449 B1 | 9/2001 | Westerlage et al. | |
| 6,339,736 B1 | 1/2002 | Moskowitz et al. | |
| 6,343,220 B1 | 1/2002 | Van Der Salm | |
| 6,370,472 B1 | 4/2002 | Fosseen | |
| 6,377,890 B1 * | 4/2002 | Doi | 701/431 |
| 6,415,210 B2 | 7/2002 | Hozuka et al. | |
| 6,429,773 B1 | 8/2002 | Schuyler | |
| 6,435,018 B1 | 8/2002 | Murakami et al. | |
| 6,441,732 B1 * | 8/2002 | Laitsaari et al. | 340/539.1 |
| 6,470,732 B1 | 10/2002 | Breton | |
| 6,487,478 B1 | 11/2002 | Azzaro et al. | |
| 6,525,643 B1 | 2/2003 | Okada et al. | |
| 6,571,617 B2 | 6/2003 | Van Niekerk et al. | |
| 6,587,040 B2 | 7/2003 | Seto | |
| 6,611,740 B2 | 8/2003 | Lowrey et al. | |
| 6,612,165 B2 | 9/2003 | Juzswik et al. | |
| 6,629,031 B2 | 9/2003 | Gustavsson et al. | |
| 6,671,609 B2 | 12/2003 | Nantz et al. | |
| 6,691,025 B2 | 2/2004 | Reimer | |
| 6,732,031 B1 | 5/2004 | Lightner et al. | |
| 6,738,697 B2 | 5/2004 | Breed | |
| 6,825,758 B1 | 11/2004 | Laitsaari | |
| 6,836,708 B2 | 12/2004 | Tripathi | |
| 6,839,614 B1 | 1/2005 | Timko et al. | |
| 6,845,314 B2 | 1/2005 | Fosseen | |
| 6,847,872 B2 | 1/2005 | Bodin et al. | |
| 6,853,853 B1 | 2/2005 | Van Wiemeersch et al. | |
| 6,868,358 B2 | 3/2005 | Brown | |
| 6,892,052 B2 | 5/2005 | Kotola et al. | |
| 6,923,509 B1 * | 8/2005 | Barnett | 303/89 |
| 6,930,614 B2 * | 8/2005 | Rackham et al. | 340/686.1 |
| 6,937,141 B2 | 8/2005 | Muramatsu | |
| 6,983,200 B2 | 1/2006 | Bodin et al. | |
| 6,993,421 B2 | 1/2006 | Pillar et al. | |
| 7,040,154 B2 | 5/2006 | Shaw et al. | |
| 7,053,761 B2 | 5/2006 | Schofield et al. | |
| 7,068,158 B2 | 6/2006 | Komatsu et al. | |
| 7,092,804 B2 | 8/2006 | Mcquade et al. | |
| 7,096,101 B2 | 8/2006 | Sonnenrein et al. | |
| 7,114,379 B2 | 10/2006 | Emord | |
| 7,170,400 B2 | 1/2007 | Cowelchuk et al. | |
| 7,171,188 B1 | 1/2007 | Watanabe et al. | |
| 7,216,532 B2 | 5/2007 | Rimkus et al. | |
| 7,218,209 B2 | 5/2007 | Utter et al. | |
| 7,219,063 B2 | 5/2007 | Schalk et al. | |
| 7,224,262 B2 | 5/2007 | Simon et al. | |
| 7,228,122 B2 | 6/2007 | Oyagi et al. | |
| 7,319,378 B1 | 1/2008 | Thompson et al. | |
| 7,379,541 B2 | 5/2008 | Iggulden et al. | |
| 7,394,352 B2 | 7/2008 | Bell et al. | |
| 7,509,849 B2 | 3/2009 | Rutherford et al. | |
| 7,545,261 B1 * | 6/2009 | Harrington | 340/435 |
| 7,778,186 B2 * | 8/2010 | Oman et al. | 340/5.61 |
| 7,783,246 B2 | 8/2010 | Twitchell, Jr. et al. | |
| 7,849,149 B2 | 12/2010 | Habaguchi et al. | |
| 7,859,392 B2 | 12/2010 | McClellan et al. | |
| 8,061,879 B2 | 11/2011 | Simmons et al. | |
| 8,089,348 B2 | 1/2012 | Kameyama | |
| 8,120,475 B2 | 2/2012 | Iwamoto et al. | |
| 8,325,028 B2 | 12/2012 | Schofield et al. | |
| 8,558,690 B2 * | 10/2013 | Kleve et al. | 340/539.11 |
| 2001/0033225 A1 | 10/2001 | Razavi et al. | |
| 2002/0130771 A1 | 9/2002 | Osborne et al. | |
| 2003/0004741 A1 | 1/2003 | Johnson et al. | |
| 2003/0016130 A1 | 1/2003 | Joao | |
| 2003/0093218 A1 | 5/2003 | Jones | |
| 2003/0158640 A1 | 8/2003 | Pillar et al. | |
| 2003/0205081 A1 | 11/2003 | Proschka | |
| 2003/0208309 A1 | 11/2003 | Triphathi | |
| 2004/0050188 A1 | 3/2004 | Richards et al. | |
| 2004/0075539 A1 | 4/2004 | Savoie et al. | |
| 2004/0112124 A1 | 6/2004 | Sonnenrein et al. | |
| 2004/0193368 A1 | 9/2004 | Sanqunetti | |
| 2004/0203634 A1 | 10/2004 | Wang et al. | |
| 2005/0024189 A1 | 2/2005 | Weber | |
| 2005/0137763 A1 | 6/2005 | Watkins et al. | |
| 2005/0179518 A1 | 8/2005 | Kawamura et al. | |
| 2005/0187693 A1 * | 8/2005 | Bate et al. | 701/70 |
| 2005/0190900 A1 | 9/2005 | White et al. | |
| 2005/0195106 A1 | 9/2005 | Davis et al. | |
| 2005/0273218 A1 | 12/2005 | Breed et al. | |
| 2006/0095174 A1 | 5/2006 | Sonnenrein et al. | |
| 2006/0208865 A1 | 9/2006 | Quach et al. | |
| 2006/0220806 A1 | 10/2006 | Nguyen | |
| 2006/0220809 A1 | 10/2006 | Stigall et al. | |
| 2006/0220813 A1 | 10/2006 | Utter et al. | |
| 2006/0235652 A1 | 10/2006 | Rimkus et al. | |
| 2006/0273885 A1 | 12/2006 | Thompson | |
| 2006/0288101 A1 | 12/2006 | Mastrodonato et al. | |
| 2006/0293849 A1 * | 12/2006 | Baldwin | 701/213 |
| 2007/0015548 A1 | 1/2007 | Flick | |
| 2007/0027595 A1 | 2/2007 | Nou | |
| 2007/0060056 A1 | 3/2007 | Whitaker et al. | |
| 2007/0069951 A1 | 3/2007 | Sweet | |
| 2007/0155300 A1 | 7/2007 | Hsieh | |
| 2007/0156317 A1 | 7/2007 | Breed | |
| 2007/0193348 A1 | 8/2007 | Rutherford et al. | |
| 2007/0200671 A1 | 8/2007 | Kelley et al. | |
| 2007/0229350 A1 | 10/2007 | Scalisi et al. | |
| 2007/0290881 A1 | 12/2007 | Nikitin et al. | |
| 2008/0024285 A1 | 1/2008 | Vandenbrink et al. | |
| 2008/0046149 A1 | 2/2008 | Breed | |
| 2008/0077292 A1 | 3/2008 | Gisler | |
| 2008/0082221 A1 | 4/2008 | Nagy | |
| 2008/0098855 A1 * | 5/2008 | Cegelski et al. | 81/15.6 |
| 2008/0106859 A1 | 5/2008 | Eguchi et al. | |
| 2008/0125665 A1 | 5/2008 | Nigam | |
| 2008/0136611 A1 | 6/2008 | Benco et al. | |
| 2008/0140265 A1 | 6/2008 | Hong et al. | |
| 2008/0147265 A1 | 6/2008 | Breed | |
| 2008/0147271 A1 | 6/2008 | Breed | |
| 2008/0172147 A1 | 7/2008 | Taki et al. | |
| 2008/0197970 A1 | 8/2008 | Fouts | |
| 2008/0204556 A1 | 8/2008 | de Miranda et al. | |
| 2008/0215665 A1 | 9/2008 | Appleby et al. | |
| 2008/0228355 A1 | 9/2008 | de Jonk et al. | |
| 2008/0266051 A1 | 10/2008 | Taki et al. | |
| 2008/0299961 A1 | 12/2008 | Muller et al. | |
| 2008/0309451 A1 | 12/2008 | Zellweger et al. | |
| 2009/0075624 A1 | 3/2009 | Cox et al. | |
| 2009/0091437 A1 | 4/2009 | Corniot | |
| 2009/0096575 A1 | 4/2009 | Tieman | |
| 2009/0096576 A1 | 4/2009 | Oman et al. | |
| 2009/0096596 A1 | 4/2009 | Sultan et al. | |
| 2009/0098907 A1 | 4/2009 | Huntzicker et al. | |
| 2009/0167524 A1 | 7/2009 | Chesnutt et al. | |
| 2009/0273438 A1 | 11/2009 | Sultan et al. | |
| 2010/0047744 A1 * | 2/2010 | Miura | 434/66 |
| 2010/0145759 A1 | 6/2010 | Hembury | |
| 2010/0168967 A1 | 7/2010 | Dlugoss et al. | |
| 2010/0233957 A1 | 9/2010 | Dobosz | |
| 2011/0015971 A1 | 1/2011 | Hembury | |
| 2011/0029875 A1 | 2/2011 | Milch | |
| 2011/0071720 A1 | 3/2011 | Schondorf et al. | |
| 2011/0071725 A1 | 3/2011 | Kleve et al. | |
| 2011/0071734 A1 | 3/2011 | Van Wiemeersch et al. | |
| 2011/0080282 A1 | 4/2011 | Kleve et al. | |

(56) References Cited

U.S. PATENT DOCUMENTS

| | | |
|---|---|---|
| 2011/0130945 A1 | 6/2011 | Deedy et al. |
| 2011/0205040 A1 | 8/2011 | Van Wiemeersch |
| 2011/0205047 A1 | 8/2011 | Patel et al. |
| 2011/0215901 A1 | 9/2011 | Van Wiemeersch et al. |
| 2011/0230165 A1 | 9/2011 | Kleve et al. |

OTHER PUBLICATIONS

Solindo GOS, Solindo Web Products: The Solutions Provider Company. Printout from www.solindoweb.com/products.php on Sep. 16, 2009, pp. 1-4.

J. Smith, Wanted: One Gorilla, printed from www.tirereview.com, Jul. 27, 2009.

Check Tire Pressure with Bluetooth, printed from www.esato.com, Jul. 30, 2004.

Acumine Pty Ltd—Fleet Monitoring System, http://www.acumine.com/_Products/Fleet Monitoring.php., May 22, 2009.

911 Assist, Vehicle Health Report Expand Sync Capabilities and Convenience Features, printout from www.media.ford.com.

Vehicle Health Report Delivers Assistance With Vehicle Maintenance and Monitoring, printout from www.media.ford.com.

Chinese Office Action, FMC 2913 PUS1 Family, Dated Mar. 4, 2013.

German Office Action, FMC 2913 PUS1 Family, Dated Mar. 1, 2013.

Chinese Patent Office, First Office Action for the corresponding Chinese Patent Application No. 201010502329.X mailed Mar. 18, 2014.

* cited by examiner

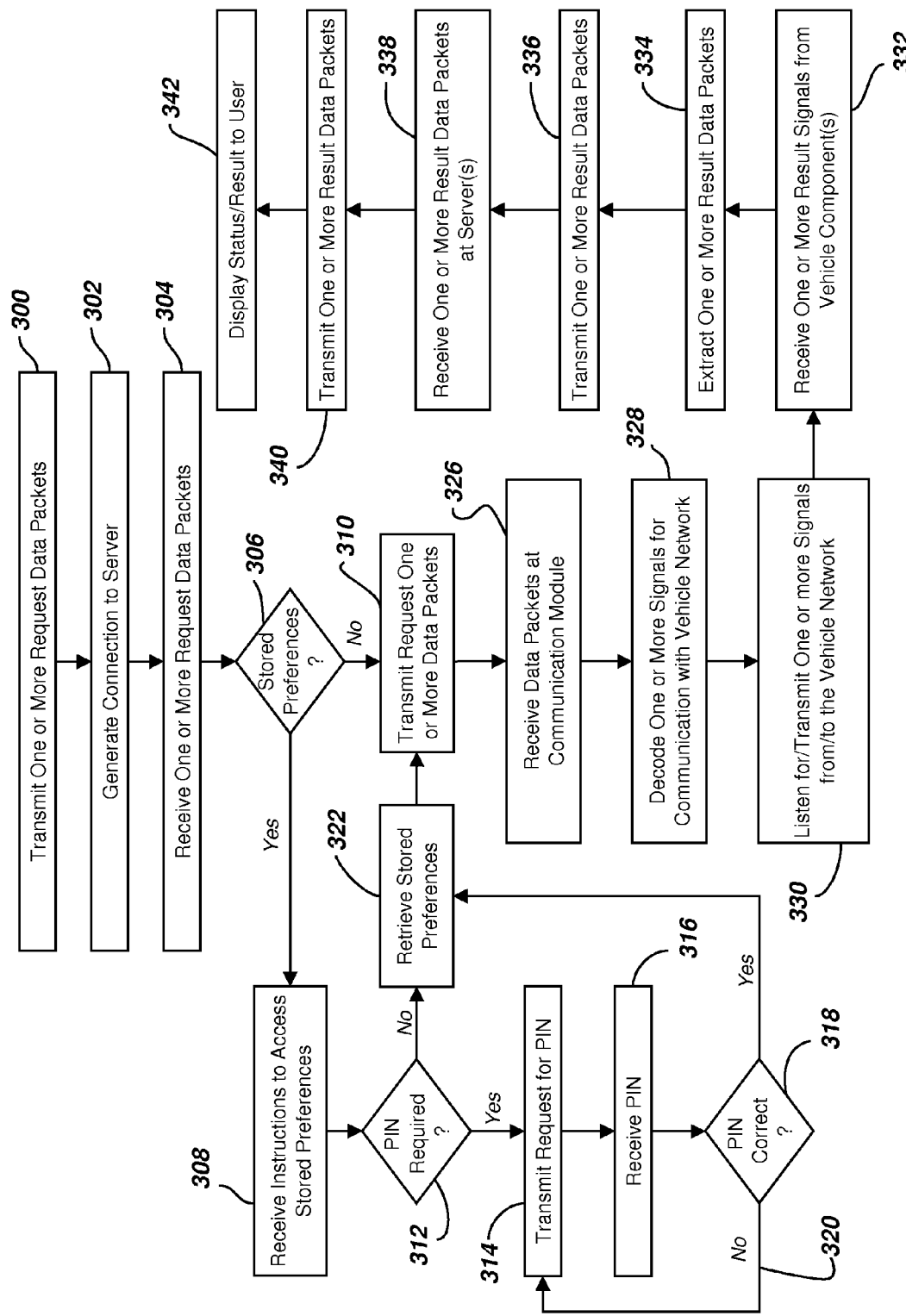

VEHICLE SYSTEM PASSIVE NOTIFICATION USING REMOTE DEVICE

CROSS-REFERENCE TO RELATED APPLICATIONS

This application is a continuation of U.S. application Ser. No. 12/571,517 filed Oct. 1, 2009, now U.S. Pat. No. 8,558, 690, the disclosure of which is hereby incorporated in its entirety by reference herein.

TECHNICAL FIELD

The illustrative embodiments generally relate to vehicle system passive notification using a remote device.

BACKGROUND

Cellular phone and PDA displays are growing increasingly capable of displaying an ever more complex variety of information. Color, touch-sensitive displays can present a user with graphic interfaces, detailed figures, and a variety of other interactive information.

Additionally, there is an increasing need in society to have information access on-demand. In a world of GOOGLE, YAHOO! and WIKIPEDIA, users are growing used to having any and all desired information at their fingertips.

This information, while useful in many areas, is also often static information. That is, it is fixed, factual information. Integration, however, of dynamic "facts" has slowly begun.

Also, it is now possible to have updates, such as an update indicating when a bill is due, sent to a cellular phone as, for example, a text message.

SUMMARY

In a first illustrative embodiment, a method for monitoring a vehicle sensor includes activating one or more monitoring systems and monitoring the one or more activated monitoring systems.

The exemplary method further includes checking a power source providing power to the one or more monitoring systems to determine if the power source is below a certain threshold. The method also includes sending a low power alert to a user on a remote device if the power source determined to be below the threshold, and ceasing monitoring of the one or more systems being monitored if the power source is below the threshold.

Further, the method includes detecting a change in the state of the one or more systems being monitored and sending an alert to the user on the remote device if at least one of the one or more monitoring systems have changed state to a state in which an alert is to be sent.

In a second illustrative embodiment, a method of vehicle monitoring includes monitoring one or more vehicle safety systems while a vehicle is in operation to detect an unsafe condition. The method also includes sending an alert to a handheld device if an unsafe condition is detected.

In a third illustrative embodiment, a method of vehicle monitoring includes determining if a specific driver class is present in a vehicle. This method further includes determining one or more class specific safety systems to monitor based at least in part on a determined driver class. Also, this method includes monitoring the one or more class specific safety systems while a vehicle is in operation to detect an unsafe condition and sending an alert to a handheld device if an unsafe condition is detected.

[column 2]

In a fourth illustrative embodiment, a method of monitoring vehicle systems includes determining if a vehicle system to be monitored is in an alert state and determining if a vehicle is occupied. Based at least in part on the vehicle system alert state determination and whether the vehicle is determined to be occupied, the method may send a vehicle system alert based at least in part on a determined alert state to a user's wireless device.

BRIEF DESCRIPTION OF THE DRAWINGS

FIG. 3 shows an illustrative example of communication between a remote wireless device and a vehicle based wireless device;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Detailed embodiments of the present invention are disclosed herein. However, it is to be understood that the disclosed embodiments are merely exemplary of an invention that may be embodied in various and alternative forms. Therefore, specific functional details disclosed herein are not to be interpreted as limiting, but merely as a representative basis for the claims and/or as a representative basis for teaching one skilled in the art to variously employ the present invention.

Figure 1:
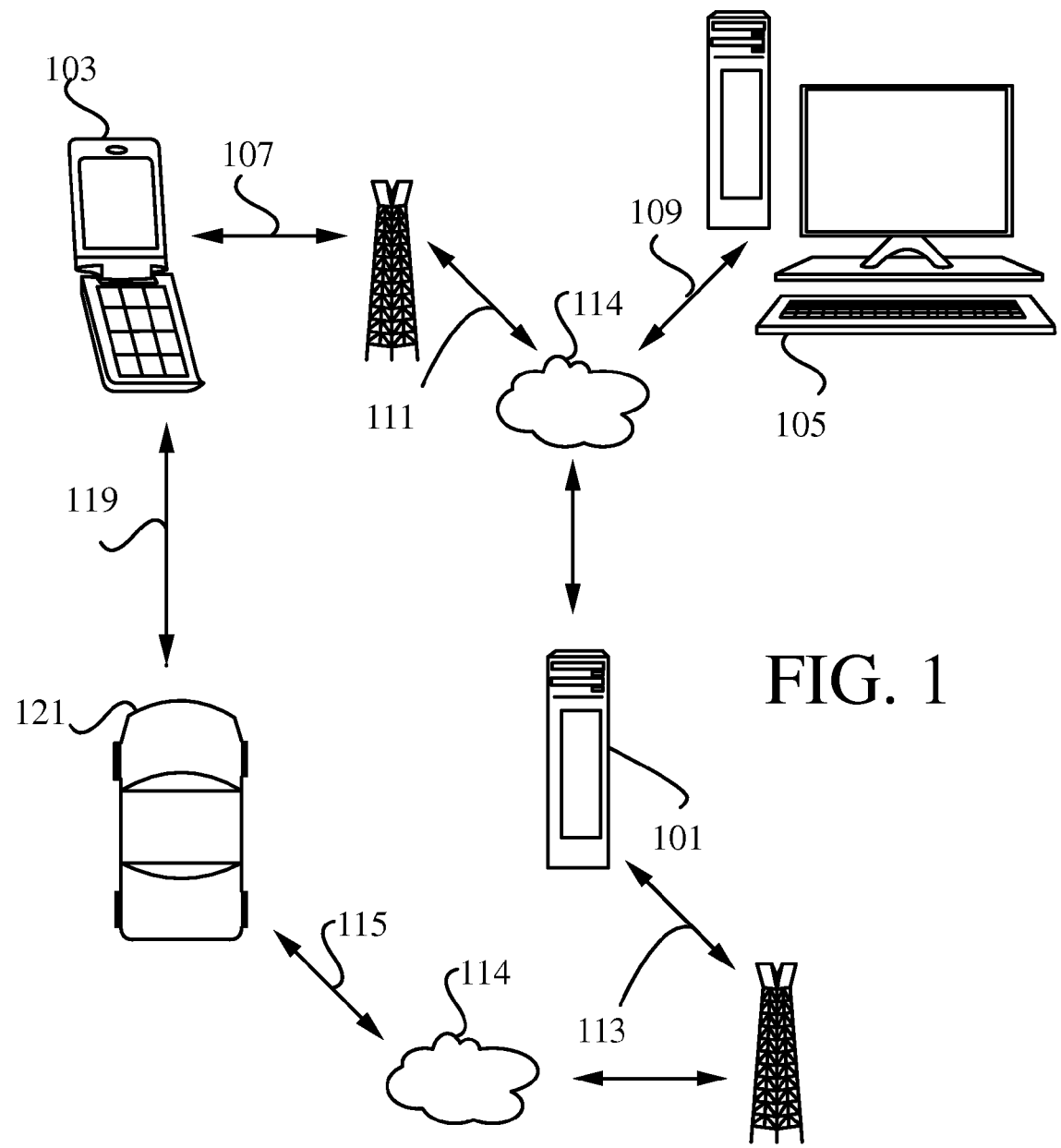
FIG. 1 shows an illustrative example of a communication system through which a nomadic device can communicate with a vehicle.

FIG. 1 shows an illustrative example of a communication system through which a nomadic device can communicate with a vehicle 121. In this illustrative embodiment, a nomadic device (e.g., without limitation, a cellular phone) 103 is used to send a communication through a cellular network 107. This communication is relayed through a network 111 (e.g., without limitation, the cellular network, the internet, etc.) to a centralized system 101. A system similar to the system shown in FIG. 1 is available from CRAYON INTERFACE, INC.

In this illustrative embodiment, the centralized system is a server system that includes processing capability for incoming nomadic device signals designated to interact with a remote vehicle 121.

For example, the server(s) 101 may include an automated call server and/or web host. Further, the server(s) 101 may route an incoming signal from a nomadic device (ND) 103 to the appropriate remote vehicle. Data sent in this fashion may be sent using data-over-voice, a data-plan, or in any other suitable format.

Data can also be sent to the remote vehicle 121 through the server(s) 101 using a personal computer 105. In this case, the data is likely, although not necessarily, sent over the internet 109.

Once the server(s) 101 receive the incoming data request from the remote source 103, 105, the message is processed and/or relayed to a vehicle 121. The vehicle may be identified by a header associated with one or more incoming data packets, or may be identifiable based on a database lookup, for example.

The relay to the vehicle 121 is sent out from the server(s) 101 through a network (e.g., without limitation, a cellular network 113, the internet, etc.) and passed through a cellular network 115 to the vehicle 121. In one embodiment, the relay may additionally be passed through a broadband network 114 (e.g., 802.11g or WiMax). A remote communication module 200 in the vehicle 121 receives the signal sent from the server(s) 101 and processes it or relays it to an appropriate processing system within the vehicle 121.

In at least one illustrative embodiment, the vehicle 121 is also outfitted with a communication transceiver, such as, but not limited to, a BLUETOOTH transceiver. This transceiver may allow communication with the nomadic device 103 using a direct signal 119 if, for example, cellular networks are unavailable.

FIGS. 2a-d show illustrative examples of vehicle-based communication modules that provide communication to a remote network.

Figure 2A:
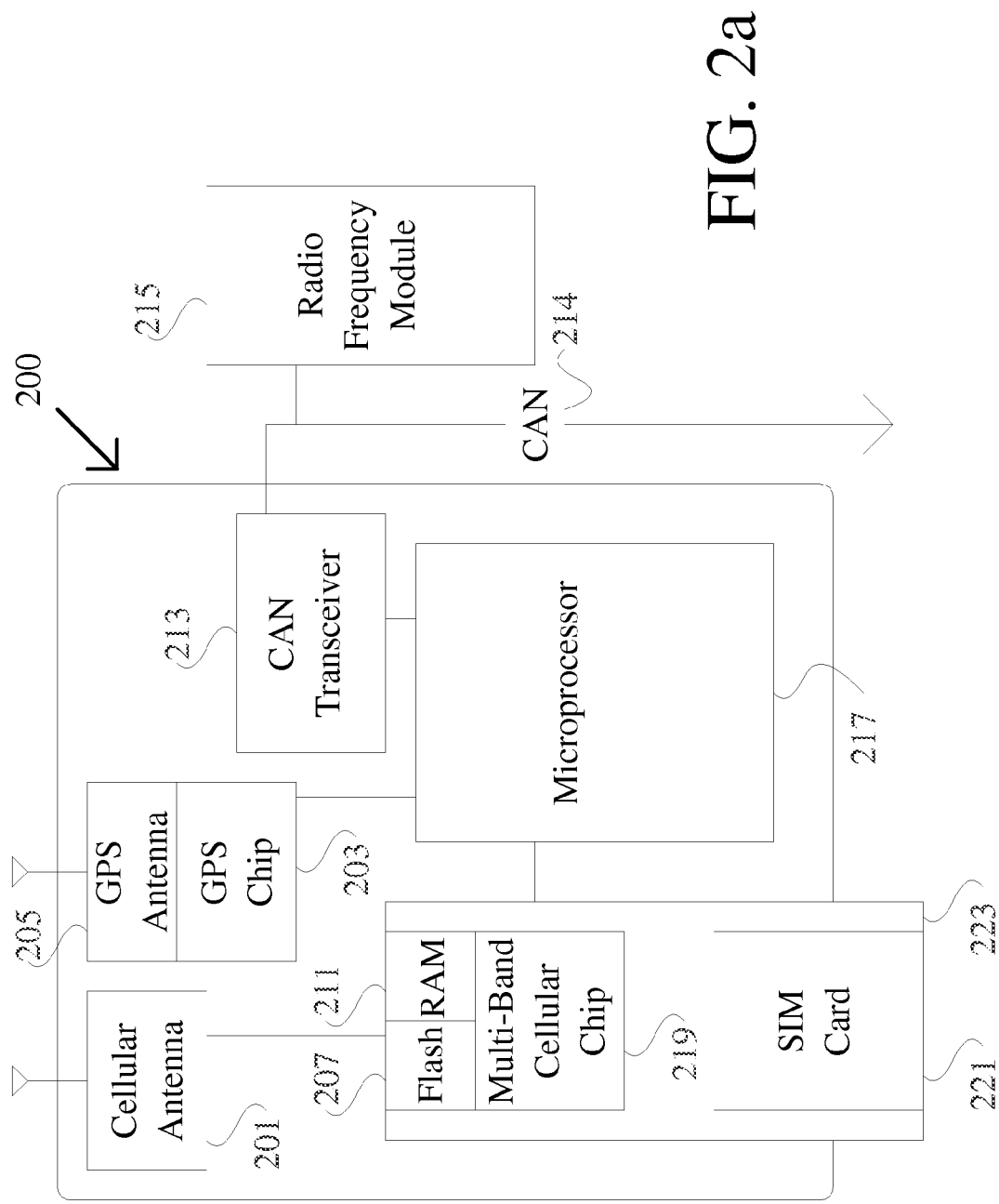
FIGS. 2*a-d* show illustrative examples of vehicle-based communication modules that provide communication to a remote network.

FIG. 2a shows an illustrative example of a communication module 200 combined with a GPS module, wherein a cellular module and GPS are on different boards.

In this illustrative embodiment, a communications module 200 can include a cellular (e.g., and without limitation, GSM or CDMA) antenna 201 that communicates with a remote server over a cellular network. The received cellular signal may be sent from the cellular antenna 201 to a multi-band cellular (e.g., and without limitation, GSM or CDMA) decoder 219 that processes the received signal to produce information usable by the microprocessor 217.

In this illustrative embodiment, the multi-band cellular chip 219, including flash memory 207 and RAM 211, is installed in the module as part of a removable device 223 including a SIM card 221. The SIM card 221 may contain user identifying information that allows access to the cellular network under a particular user's plan.

Additionally, the module includes a GPS chip 203 that can process and decode a signal from the GPS antenna 205 and send this information to a microprocessor 217.

The microprocessor is also in communication with a vehicle data bus that provides access to various vehicle modules, such as RF module 215. Other modules not shown include, but are not limited to, the vehicle cluster, a remote (off-board) GPS system, a radio module, etc. Non-limiting examples of a vehicle data bus include an SAE J1850 bus, a CAN bus, a GMLAN bus, and any other vehicle data buses known in the art. For illustration purposes only, FIGS. 2a-2d are represented as using a CAN bus.

Figure 2B:
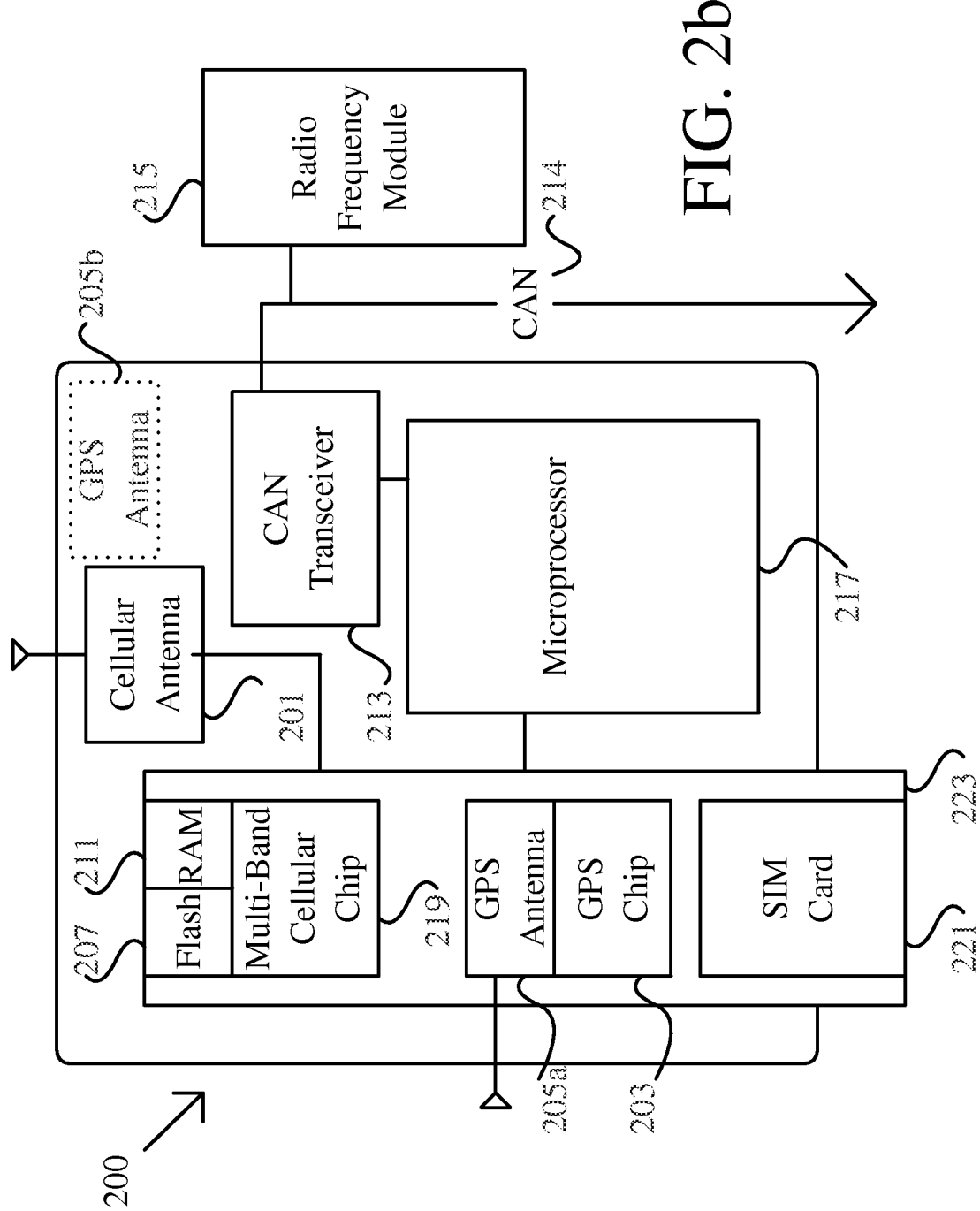

FIG. 2b shows a second exemplary embodiment in which a cellular chip and GPS are on the same board 223. In this illustrative embodiment, the removable board (this board may also be permanently attached to the module) 223 may contain the SIM card 221, a GPS module including a GPS chip 203 and a GPS antenna 205a, and the Multi-band cellular chip 219 including flash memory 207 and RAM 211.

In another embodiment, the GPS antenna 205b may be attached to the module separately from this board 223. When a signal comes in from the cellular antenna 201 and/or the GPS antenna 205b, the signal may be sent to the corresponding cellular/GPS chip 203 for processing, and then passed to the microprocessor 217. The microprocessor 217 interfaces with the CAN transceiver 213 to connect to a vehicle network 214 and vehicle modules such as RF module 215.

Figure 2C:
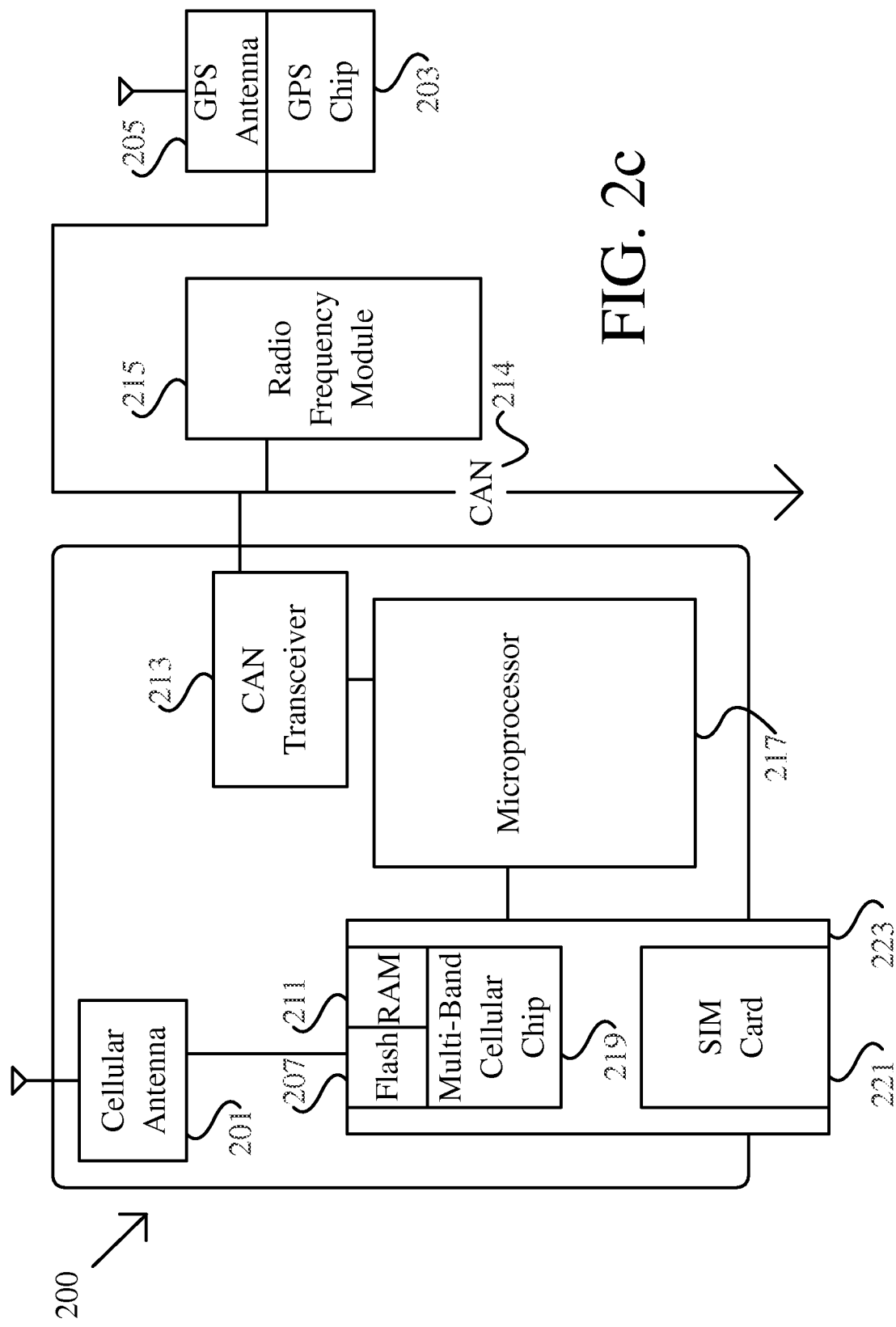

FIG. 2c shows yet another exemplary embodiment in which the cellular module is standalone. In this illustrative embodiment, the GPS module containing the GPS antenna 205 and the GPS chip 203 may connect to the microprocessor 217 through the CAN transceiver 213. Other vehicle modules, such as an RF module 215 can also connect to the microprocessor through the CAN transceiver 213.

In this illustrative embodiment, the removable board 223 may contain a SIM card 221 and a multi-band cellular chip 219, as well as a flash memory 207 and RAM 211. Signals from the cellular antenna 201 may be sent to the board 223 for processing by the multi-band cellular chip 219 before being sent to the microprocessor 217.

Figure 2D:
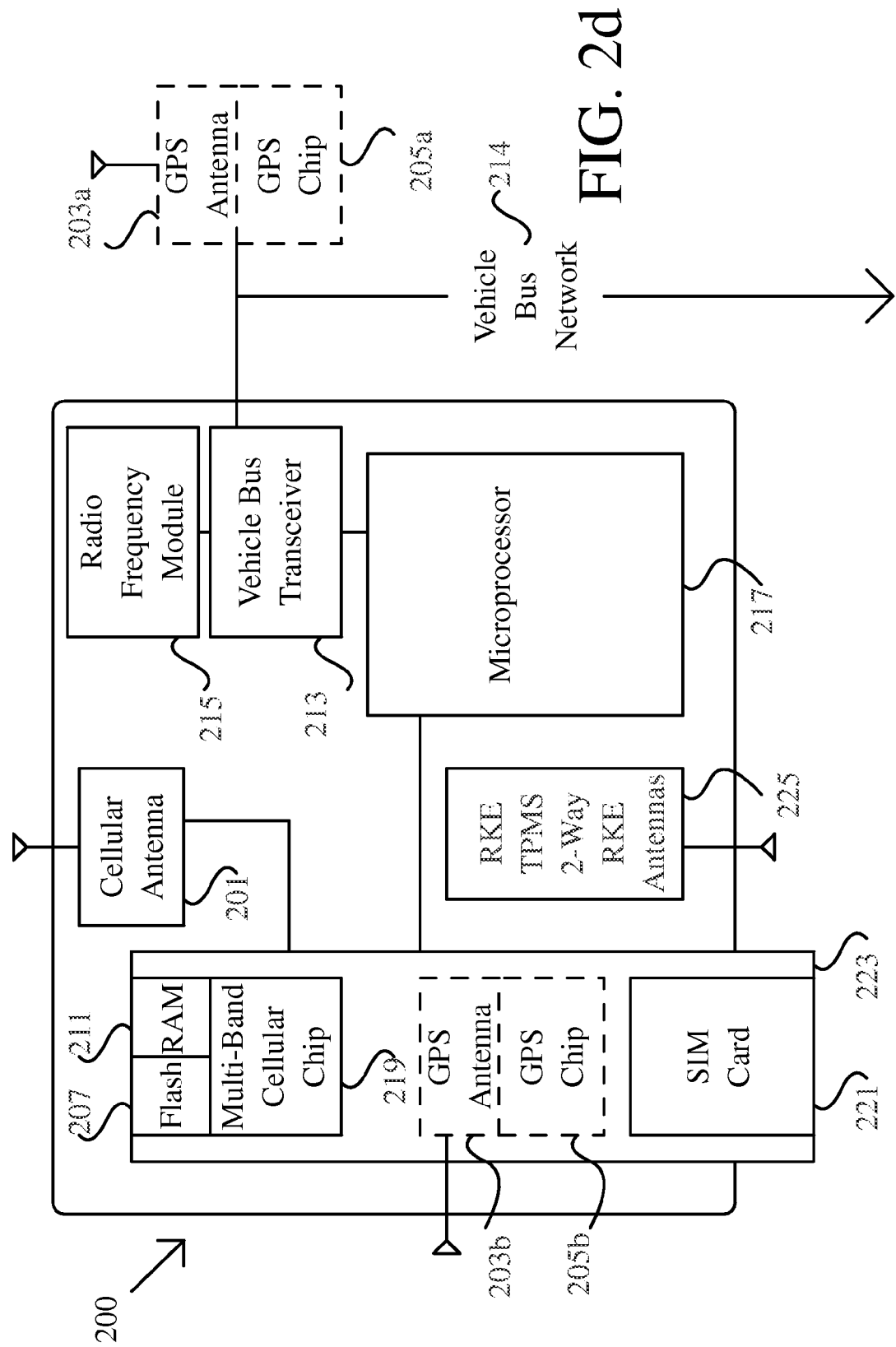

FIG. 2d shows still another exemplary embodiment in which a cellular module is combined with an RF module 215 in the communications module 200. The RF module 215 may continue to talk to the microprocessor 217 through the CAN transceiver 213. In this illustrative embodiment, the GPS module, including the GPS antenna 203a, 203b and GPS chip 205a, 205b can be located within the communications module 200 or located elsewhere in the vehicle, in which case it may communicate with the microprocessor 217 through the CAN transceiver 213.

Again, in this embodiment, the cellular antenna 201 may send a signal to the multi-band cellular 219, including flash memory 207 and RAM 211. The signal may be processed and sent to the microprocessor 217. The multi band cellular chip 219 may be located on a removable circuit board 223, which may also include a SIM card 221.

FIG. 3 illustrates the operation of a communication module 200 according to one illustrative embodiment. The nomadic device (ND) 103 and/or computer 105 may include software for facilitating the operation of the one or more embodiments. The software may be downloaded to the ND 103 or computer 105 from a website (such as an OEM's website) or, as another example, come factory installed in the ND. In one embodiment, the software may be a programmed in the JAVA language (manufactured and distributed by Sun Microsystems).

In one or more exemplary embodiments, a user may control one vehicle with multiple NDs 103 or computers 105. Additionally or alternatively, the user may use one ND 103 or computer 105 to operate components of multiple vehicles.

The user may activate and operate the software using one or more button or key presses from his or her ND 103 and/or computer 105. In one illustrative embodiment, the ND 103 and/or computer 105 may be equipped with a hot-key from which the software may be activated. Alternatively or additionally, the user may activate and operate the software through a menu selection from a graphical user interface (GUI) displayed on the ND 103 and/or computer 105.

Further, computer readable storage mediums, including, but not limited to, hard disk drives, persistent and non-persistent memory, floppy disks, CDs, DvDs, flash drives, zip drives, etc. may contain instructions that facilitate one or more of the illustrative embodiments. The instructions are typically machine readable and executable by a processor on, for example, without limitation, the nomadic device, the server, and/or the vehicle based microprocessor.

Alternatively or additionally, the user may operate and activate the software through one or more voice-activated commands received by the ND 103 and/or computer 105. The ND 103 and/or computer 105 may include speech recognition software for interpreting and processing commands from a user into machine readable language. In one embodiment, the speech recognition software may be programmed and/or stored to the web server. Non-limiting examples of a user may be a vehicle owner, a vehicle passenger, a vehicle service technician, or a vehicle dealer.

Upon making the request (via, e.g., key button press or voice), one or more data packets may be transmitted from the ND 103 or computer 105 as illustrated in block 300. Non-limiting examples of data (i.e., information) transmitted in the data packets may include a mobile identification number (MIN), a customer identification number, the one or more commands triggered from the ND 103 and/or 105, and the vehicle identification number (VIN). Furthermore, in some embodiments, the one or more data packets transmitted from the ND 103 and/or computer 105 may include instructions for operating according to the one or more requests made by the user.

Referring back to FIG. 3, before or after the data packets are transmitted, a connection may be generated with the server(s) 101 as illustrated in block 302. The server(s) 101 may or may not be a web server. Once a connection to sever(s) 101 is made, the data packets may be received by the server(s) 101 as illustrated in block 304. Alternatively or additionally, a direct connection may be made between the ND 103 or computer 105 and the cellular communication module 200 (i.e., without making a connection to server(s) 101). Accordingly, the operation of one or more embodiments of the present invention may be accomplished without a server.

The server(s) 101 may process one or more received commands for transmission to the vehicle 121. Processing the data packet may include, but is not limited to, authenticating the one or more commands, authenticating the user (e.g., determining if the user is a registered user) and authenticating the cellular/mobile phone (e.g., matching the MIN to the VIN) transmitted in the data packet. In one non-limiting embodiment, the server(s) 101 may process the data packet using one or more look-up tables and validating the information in the data packets against the one or more tables.

The server(s) 101 may be in further communication with one or more databases (not shown). The data may be retrieved from third-party systems, OEM (e.g., vehicle) databases/servers or manually inputted by a user (e.g., an OEM).

In one exemplary embodiment, a determination may be made at the server(s) 101 if the user has any personal preferences as illustrated in block 306. While the preferences may be stored elsewhere, for purposes of illustration, FIG. 3 illustrates the operation based on the personal preferences being stored on the server(s) 101.

The personal preferences may be stored on the server(s) 101. Alternatively or additionally, the personal preferences may be stored in the ND's 103 or computer's 105 memory (not shown). In yet another embodiment, the personal preferences may be stored at the vehicle (e.g., on the SIM card 221, on the microprocessor 217 of the cellular communication module 200, or in a memory module present elsewhere in the vehicle). In this latter embodiment, the server(s) 101 may route the data packets to the vehicle without further processing.

Referring back to FIG. 3, if the user has personal preferences associated with one or more vehicle components, the server(s) 101 may receive instructions to access the stored preferences as illustrated in block 308. In one embodiment, the instructions may be transmitted with the one or more data packets received from the ND 103 and/or computer 105. The server(s) 101 may extract or read these instructions from the data packets to retrieve the stored personal preferences.

In one illustrative embodiment, a further determination may be made at server(s) 101 as to whether a personal identification number (PIN) is required to access the personal preferences or to operate one or more features of the software as illustrated in block 312. The PIN may be stored at server(s) 101 or may be transmitted with the data packets transmitted from the ND 103 and/or the computer 105. If a PIN is required, the server(s) 101 may transmit a request for the PIN as illustrated in block 314. The request may be transmitted to one or more memory locations (e.g., a database) on the server(s) 101 or to the remote terminals 103, 105. The PIN may be retrieved from the server(s) 101 using, for example, a look-up table based on information such as VIN, a customer number, a MIN, or other non-limiting identifiers. It should be understood that the PIN may be retrieved in any other means known in the art and the previous example is illustrative.

For example, it may be desirable to "PIN restrict" only certain features. A tracking feature, for example, may be PIN restricted, since it would allow a person who found a cellular phone to also find the vehicle, and possibly gain entry, depending on the features available on the phone. Accordingly, the tracking feature may require a PIN entry to activate.

In one illustrative embodiment, once a PIN has been entered once, it may not need to be re-entered until the phone has been deactivated and reactivated.

The server(s) 101 may receive the PIN as illustrated in block 316. The PIN may then be validated as illustrated in block 318. If the PIN is not correct, the server(s) 101 may re-transmit the request as represented by loop 320. In one embodiment, a user may reenter a PIN a predetermined number of times (e.g., 3 or 5 times) after entering an incorrect PIN. If the PIN is correct, the server(s) 101 may retrieve the personal preferences associated with the request, as illustrated in block 322, and transmit the one or more data packets with the stored preferences to the cellular communication module as illustrated in block 310.

If a PIN is not required to access the personal preferences or if there are no stored preferences, upon receiving the one or more data packets, the server(s) 101 may transmit the one or more data packets to the cellular communication module as represented in block 310. The one or more data packets may be transmitted over the network (e.g., cellular network 113 or the internet). The cellular communication module 200 may then receive (e.g., via GSM antenna 201) the one or more data packets over the network as represented in block 326. One or more signals for transmission to the vehicle CAN network 214 may then be generated (e.g., by the multi-band GSM decoder 219) as represented in block 328.

In one embodiment, the one or more signals may be decoded and translated for transmission to the CAN interface (e.g., CAN transceiver 213 and vehicle network 214) at the microprocessor 217 which may be in communication with the GSM decoder 219 via electrical communication. (Other vehicle system busses different from the CAN bus may also be communicated with/though) The one or more signals may be decoded for interpretation by the vehicle network 214. The one or more signals (including the data packets) may then be transmitted to the CAN interface (e.g., the CAN transceiver 213) as represented in block 330.

The CAN transceiver 213, upon receiving the one or more request signals, may transmit the one or more request signals to the one or more vehicle components via vehicle network 214.

After one or more operation have been completed based on the request/command by the user, the CAN transceiver 213 may receive the one or more result signals transmitted from the one or more vehicle components as illustrated in block 332. The CAN transceiver 213 may transmit the one or more return signals to the microprocessor 217 for extracting one or more return data packets for transmission to the ND 103 and/or 105 as in block 334. Transmission may be accomplished by the GSM antenna 201 over network 115.

Upon transmitting the one or more result data packets, as illustrated in block 336, the data packets may be transmitted to the remote terminals 103 and/or 105. In one embodiment, the return data packets may be routed through server(s) 101, as illustrated in block 338, which may or may not further process the data packets for transmission to the remote terminals 103 and/or 105. The result data packet(s) may be transmitted to (as illustrated in block 340) and received by the ND 103 and/or computer 105.

A report may be generated and displayed to the user as illustrated in block 342. The report may be generated each time the user requests one or more operations. Alternatively or additionally, the report may be generated at predetermined time intervals or according to a user preference (e.g., on a monthly basis or each time the user specifically requests a report).

In at least one illustrative embodiment, communication between a vehicle based cellular chip and a remote wireless device is possible. This communication can be used, among other things, to send GPS coordinates of a vehicle to the wireless device. The GPS coordinates can be transmitted to a wireless transceiver over a vehicle system bus or through another connection (for example, RF or BLUETOOTH, if the GPS is not connected to a vehicle system bus).

Figure 4:
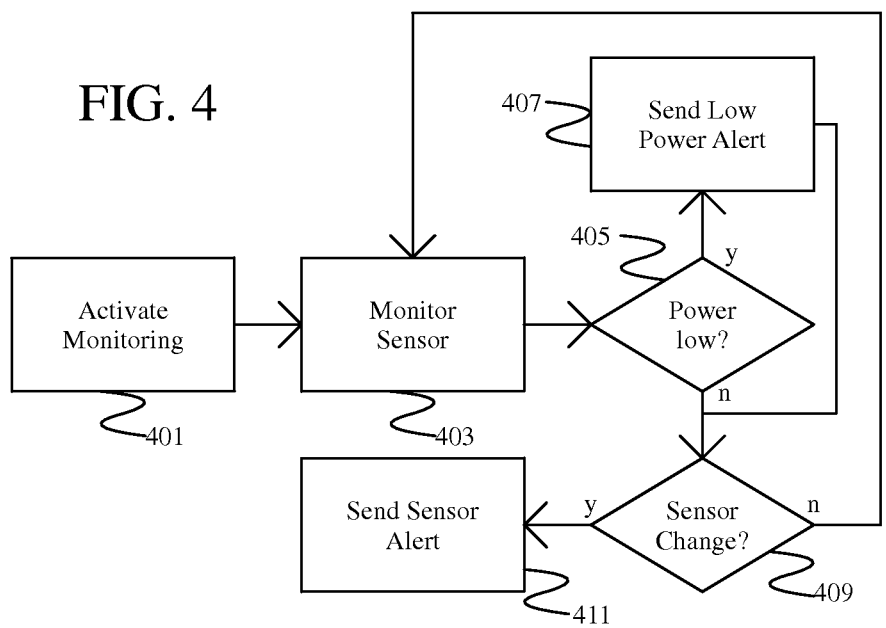
FIG. 4 shows one illustrative embodiment for passively monitoring a vehicle system.

FIG. 4 shows one illustrative embodiment for passively monitoring a vehicle system. In this illustrative embodiment, monitoring is activated 401. Monitoring can be activated from a vehicle computing system, such as the FORD SYNC system. For example, without limitation, a user could select from a touch menu or voice-activate monitoring of a specific vehicle system. Numerous vehicle systems can be passively monitored in this fashion.

In another illustrative embodiment, passive system monitoring can be activated from a remote source, such as a cellular phone or a PC. In this illustrative embodiment, the user may, for example, pull up a menu and choose a system to monitor or systems to monitor. The signal is then sent from the selecting remote device to a server, for example, and the server routes the call to an appropriate vehicle. Verification of the request can be done server side or it can be done at the vehicle itself.

Once the monitoring is activated, a microprocessor included with the vehicle may begin monitoring a selected sensor 403 through, for example, a vehicle system bus. In this illustrative example, a signal can be sent to the sensor or received from the sensor querying a sensor state. The sensor can be a binary sensor (is something in a first state or a second state) or the sensor can be monitoring for a specific threshold change. This monitoring can be done periodically with a power-up strategy or continuously.

Further, in this illustrative embodiment, a power source can be provided to power the microprocessor and/or the sensor itself. Typically, a sensor will require some power, and it may be desirable to use a power source other than the battery. A capacitor can be provided with the vehicle to power the system, or a limited battery charge may be used. In at least one illustrative embodiment the monitoring may be performed, for example, every X minutes so as not to continually drain the power source.

As part of this illustrative process, the system checks periodically to see if the power source is running low 405. If the power source is running low, a low power alert may be sent to a user 407. This alert can be sent, for example, to a remote device such as a cellular phone or a PC. In this illustrative example, the signal is sent from a vehicle microprocessor through a cellular chip to a remote server. The signal is then routed from the remote server to the appropriate remote device, and the user is thus notified of a low power state of the power source.

Once the notification is performed, the system may continue monitoring 403. If monitoring is continued with a low power source, the system may or may not continue to alert the user of the low power state. If the power is not low, or once the low power alert has been sent, the system then checks to see if a change in the state of the sensor has occurred 409. If no change has happened in the sensor state, the system may continue to monitor the sensor 403.

If a change in the sensor state has occurred, then an alert may be sent to the user 411. For example, this alert can be sent to a remote device such as a cellular phone or a PC. This alert can be sent, for example, in the same manner that the low power alert can be sent.

Figure 5:
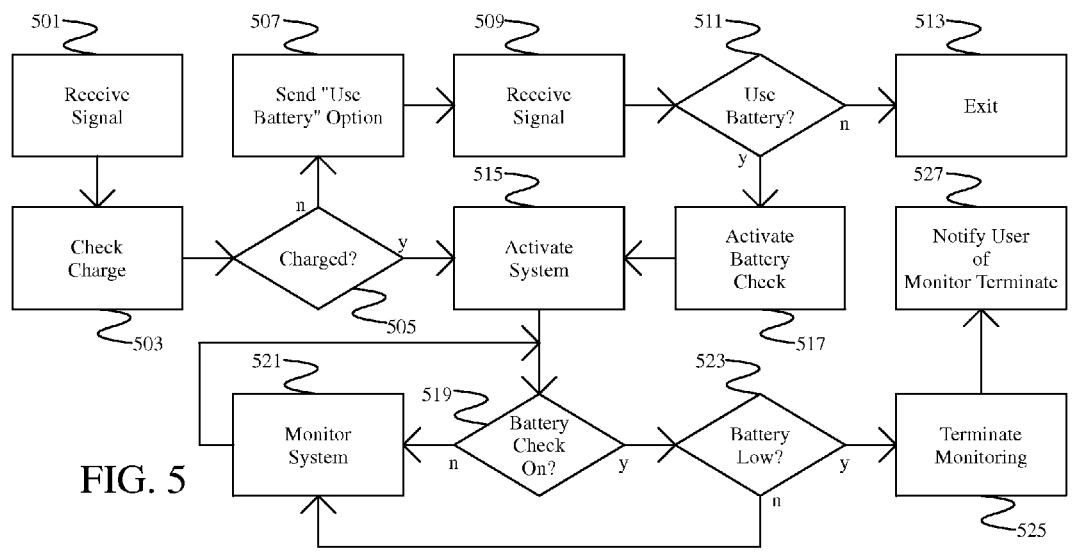
FIG. 5 shows a further illustrative embodiment of a passive monitoring strategy.

FIG. 5 shows a further illustrative embodiment of a passive monitoring strategy. In this illustrative embodiment, the vehicle system receives a signal 501. This signal can be passed from a remote device, such as a cellular phone or a PC. The signal is routed from the remote device by a server to the vehicle system. The signal may be validated at the server or at the vehicle, for example.

In this illustrative embodiment, once the signal has been received, the system checks the charge of the power source 503 (other than the battery, in this embodiment) that is used to power the microprocessor and/or the sensor.

If the power source is charged 505, the system activates the sensor and/or the monitoring from the microprocessor 515. In this illustrative embodiment, if the secondary power source is not charged 505, the system sends an option to the user to use a battery 507. Thus, in this embodiment, the vehicle battery can be used as an alternative power source to the secondary power source.

The system then receives a response from the user 509 (sent, for example, from a remote device) that instructs the system whether or not the user desires the system to use the battery in place of the secondary power source. If the user does not wish to use the battery 511, the system then exits.

If the user desires to use the battery as a power source, the system activates a battery check option 517. Since the battery is used for vital functions, such as starting a car, in this illustrative embodiment the user is first given an option to use the battery. Even if the user does want to use the battery, the system will monitor the battery in this embodiment to make sure that there is sufficient power remaining in the battery to power the vehicle.

Once the battery check has been initiated, the monitoring system is then activated 515. After the monitoring system has been activated, the vehicle system checks to determine if the battery check is activated 519. If the battery is low, 523, the system terminates the monitoring 525 to preserve battery power. In another illustrative embodiment, the a last check of the monitoring system may be made. In this embodiment, the monitoring is terminated 525 once the battery is determined to be low. Since the user may still believe the sensor is being monitored, the user is notified of the low power state of the battery and the termination of the monitoring 527. If the battery check is not on, or if the battery is not low, the system will continue to monitor the sensor(s) selected by the user for monitoring.

In still another illustrative embodiment, not shown here, the system may also monitor the secondary power source, and then notify the user if that source is running low and provide the option to use the battery 507.

Figure 6A:
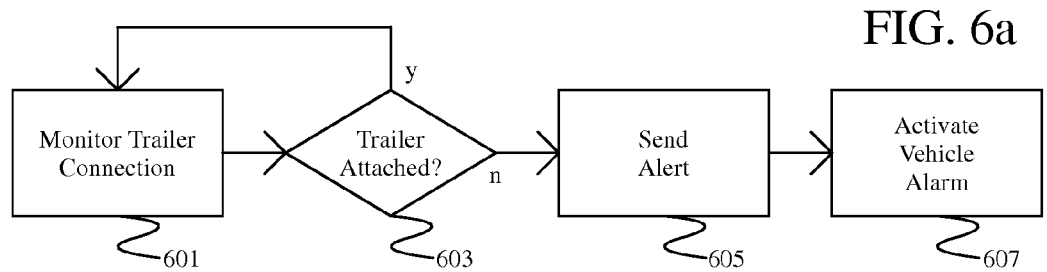
FIG. 6*a* shows an illustrative example of monitoring a trailer connection.

FIG. 6a shows an illustrative example of monitoring a trailer connection. Similar strategies can be used to monitor a variety of devices. This is but one example of a binary monitoring system where a state is either on or off.

In this illustrative embodiment, the trailer connection monitoring is activated 601. The monitoring system checks to see if the trailer is still attached 603. This can be done by checking a power connection to the trailer, or through the used of a secondary sensor provided for monitoring the connection. If the trailer is still attached, the monitoring continues 601. If the trailer is not connected, the system sends an alert to the user on a remote device 605.

Further, with certain systems, such as trailer monitoring, a secondary action may be performed. In this illustrative embodiment, it may be desirable to activate an alarm system 607. This could, for example, prevent the theft of a trailer while at the same time the user is being notified via a remote device.

Figure 6B:
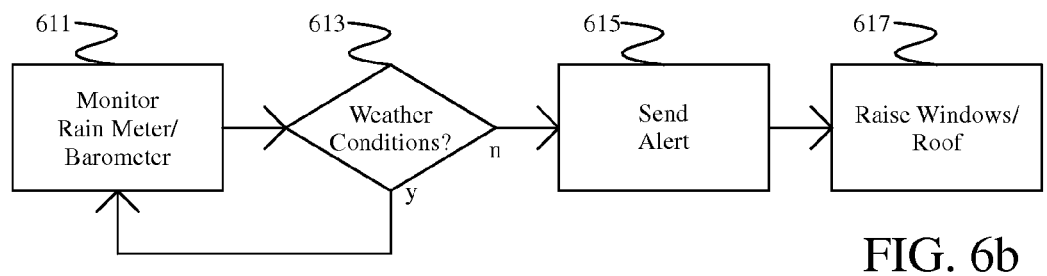
FIG. 6*b* shows a second example of monitoring a weather sensor.

In another illustrative example, shown in FIG. 6b, a sensor having a threshold is monitored. In this example, the device is a rain meter and/or a barometer 611. A rain meter could detect the presence of moisture on a sensor or the windshield, and a barometric pressure change could signal the onset of a storm. Such monitoring might be useful, for example, if a convertible top or a window were down.

In this illustrative embodiment, the system checks one or more sensors to see if a weather change has occurred 613. This could be done through the previously mentioned systems or additional systems. If the weather conditions haven't changed, the system continues to monitor the sensors 611. If the weather conditions change (for example, if a threshold has been crossed on a barometer) an alert is sent to the user via a remote device. The alert can be sent in the manners previously noted.

As with the trailer connection, a secondary action may be taken. In this illustrative embodiment, the secondary action could be to raise the windows of a car or raise the roof of a convertible 617. Or, in the alternative, a user could be provided with the option to have the vehicle system perform one or more of these actions.

Figure 7:
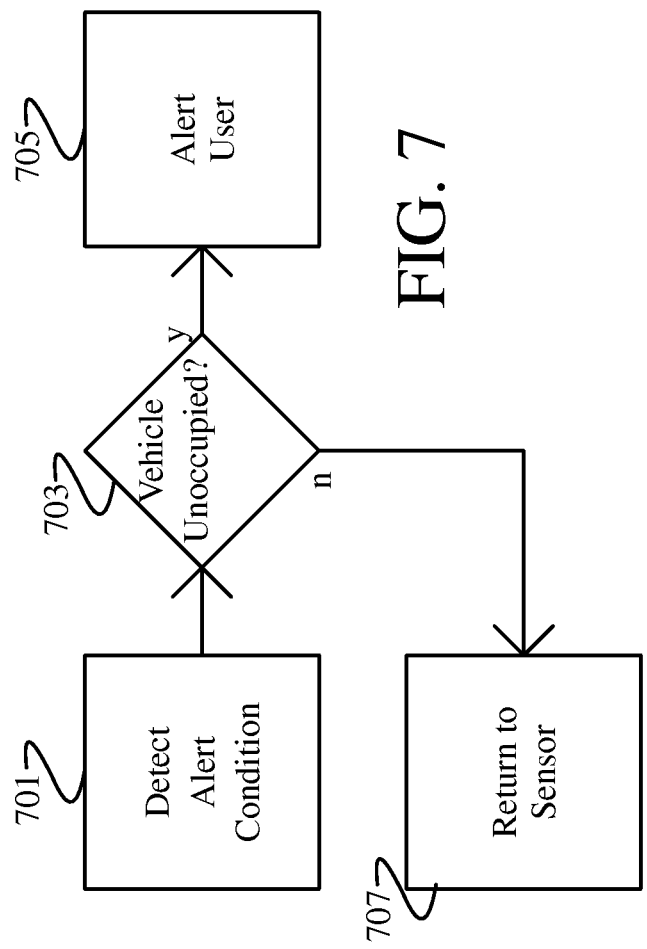
FIG. 7 shows an illustrative example of a notification strategy.

FIG. 7 shows an illustrative embodiment of a notification strategy. In at least one illustrative embodiment, it may be desirable to determine if the vehicle is, in fact, occupied before notifying the driver of a change in a condition. For example, if a "lights on" condition were sent to a phone, it may annoy a driver to receive this notification while that driver is still in the vehicle. Accordingly, in this illustrative embodiment, the system checks to see if the vehicle is still occupied before sending a notification.

Numerous possibilities for determining vehicle occupancy exist, and all are suitable for implementation of the illustrative embodiments. For example, a non-exhaustive list includes checking a vehicle power status, checking whether the doors have opened and closed, checking whether an interior camera fails to detect the presence of passengers, checking for no change in position and/or no movement of an accelerometer for a period of time, checking for no voice activity or sounds on an interior microphone.

Some or all of the above examples can be used. Further, a single example might be sufficient to determine occupancy/non-occupancy, or it may be desired to use several of the examples in concert with each other (e.g., without limitation, doors have opened and closed and vehicle power status is "off").

Numerous passive monitoring strategies can be used and/or combined with the vehicle occupancy detection. For example, a lights and/or door alert may be available. In this illustrative implementation, a vehicle can detect whether lights have been left on and/or one or more doors has been left ajar.

Although not necessary, in this implementation the detection is combined with the vehicle occupancy detection strategy, so that a user is only notified when it is reasonably determined that the vehicle is unoccupied.

Further, for at least some number of these detection strategies, the notification could be performed when, for example, a power down is being performed (so as to use the vehicle's remaining power to run the detection).

In another illustrative example, a lights-on and/or door ajar sensor check is run when a user locks a vehicle using the key fob. This typically indicates that the user is both a) no longer in the vehicle; and b) leaving the vehicle for some period of time.

Figure 8A:
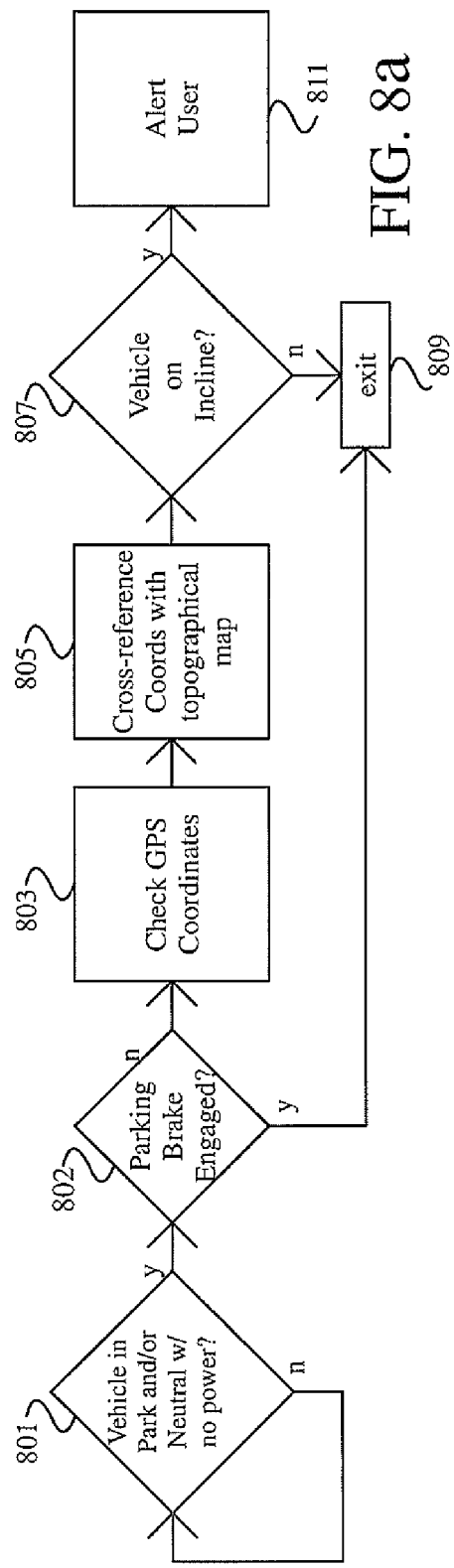
FIGS. 8*a*-8*b* show illustrative a parking brake monitor systems.
Figure 8B:
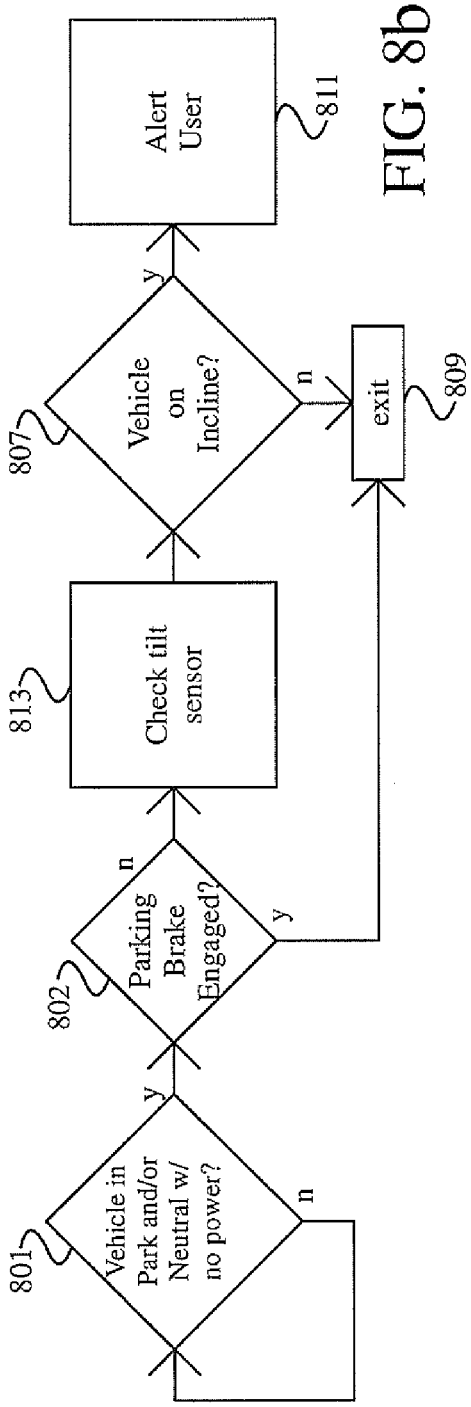

In yet a further illustrative embodiment, a parking brake monitor is provided as shown in FIGS. 8A-B. This can be especially helpful with manual transmissions, although has equal application to automatic and hybrid transmissions.

In the first illustrative embodiment, shown in FIG. 8a, the system checks to see if the vehicle has been placed into park, and/or if the vehicle is in neutral and powered down 801. This is not an exhaustive determination of when a parking brake test could be applied, for example, at least one other suitable implementation would be if the vehicle was in neutral and the brake pedal was not depressed. The system then checks to see if the parking brake has been engaged 802.

If the brake is not engaged, then the system checks the GPS coordinates of the vehicle 803 and cross references them with a topographical map 805 or some other map that would indicate an inclined slope.

If the vehicle is on an incline 807, the user is notified 809 that the parking brake is not engaged. FIG. 8b is similar to the method of FIG. 8a, except that an incline sensor in the vehicle is used 813 in place of the GPS detection and comparison 803, 805.

Although both of these methods may be combined with vehicle occupancy detection, it may be desirable to forego occupancy detection in these cases, since by the time an occupant, who has left a vehicle in neutral on a slope without the brake engaged, has left the vehicle, it may be too late to stop the vehicle from rolling away.

In still a further illustrative embodiment, a vehicle may transmit the charging/charged status of a battery if it is an electronic vehicle or a hybrid, for example.

Built in vehicle systems could be used for rental car assistance as well, for example. Vehicle locations, rental agreements, payment information, fuel level, etc. could be instantly transmitted to one or more handsets (renter, owner, etc.).

All of the previous examples have generally listed embodiments that are typically performed when a vehicle is turned off or left in a location. But, there are a number of additional possible passive monitoring alerts that can be activated and/or provided when a vehicle is turned on. Generally, in these instances, the sensor(s) can be powered by the vehicle with little concern for the battery expiring from powering the sensor(s).

In a first illustrative embodiment, an example of passive vehicle-on monitoring includes a safety status alert. This can include, but is not limited to, a low battery charge warning, a bulb expired warning, a diagnostic code set warning, a maintenance due warning, a excessive temp (oil, coolant, brake, transmission, etc.) warning, a low oil pressure warning, a low tire pressure (vehicle, trailer) warning, and a parking brake on while driving warning. Certain of these warning, such as parking brake, can be addressed without need to head to a repair station. In other instances, the location or a phone number for the nearest/appropriate repair station can be uploaded to the user's remote device in conjunction with the report.

Figure 9:
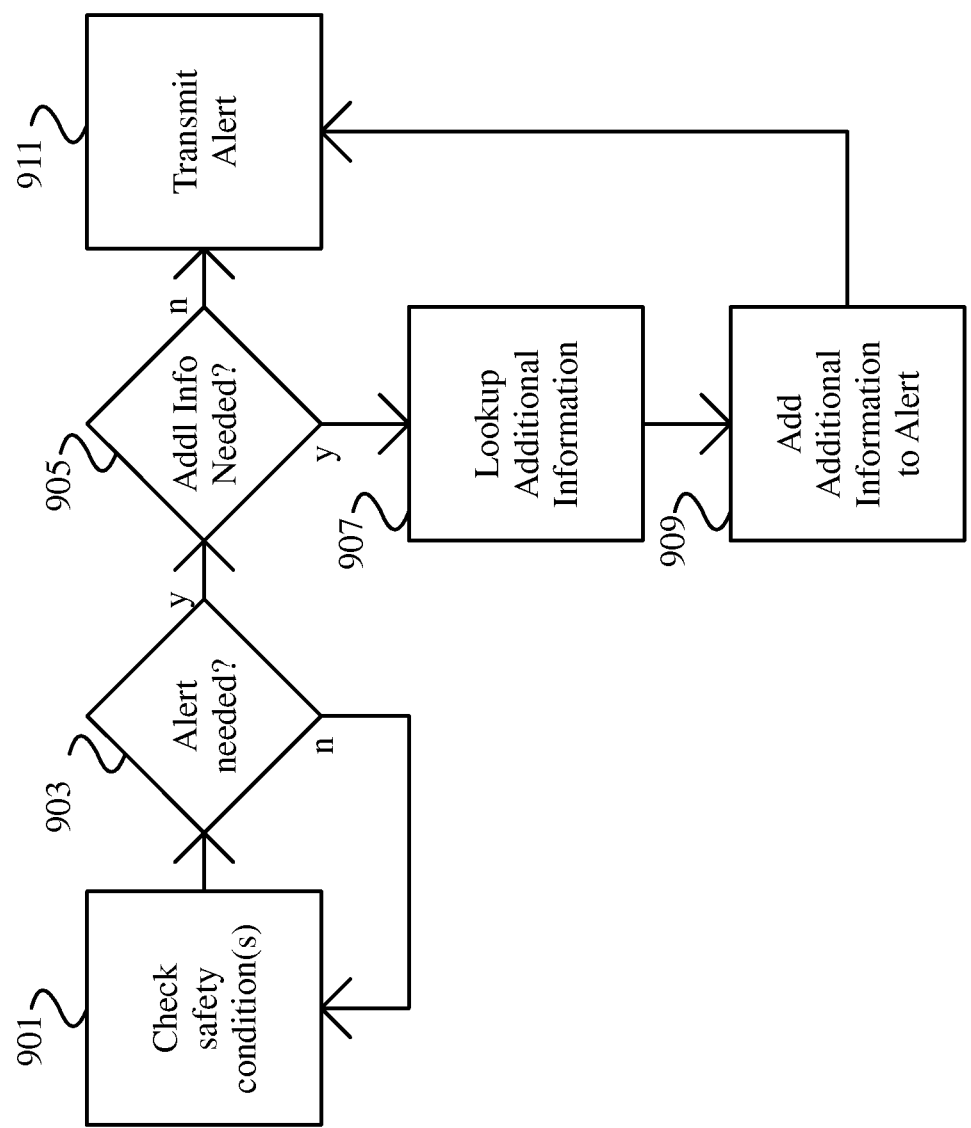
FIG. 9 shows an example of a safety alert monitoring and transmission system.

FIG. 9 shows an example of a safety alert monitoring and transmission system. In this illustrative embodiment, one or more safety sensors are checked by the system 901.

If an alert is needed 903, then the system determines if additional information (such as address, phone number, etc. of service station/dealer/gas station, etc.) is needed 905.

If the additional information is needed, the system looks up the additional information 907 and adds the additional information to the alert message 909. The alert message is then transmitted to the user 911 (the message is also transmitted in the absence of additional information).

A number of active alert thresholds can also be implemented to track driving performance/status of a certain group of drivers or a specific driver.

For example, in at least one illustrative embodiment a valet mode can be set. Similarly, a specific driver mode can be set by, for example, without limitation, use of a certain key to start the car. This may be useful if a teenager or other untrusted driver is driving the car.

When one of these modes is set, the system can send alerts to a user if certain thresholds are passed. These alerts include, but are not limited to, overtemperature monitors, driving with parking brake on monitors, aggressive driving monitors, exiting of certain "geofence" area monitors, excessive speed monitors, airbag deployment or other vehicle safety system activation monitors (in this event, whether or not the vehicle is in a specific user mode, a secondary message may be sent to any and all stored emergency contact information). Additional alerts can include a "sleepy driver" alert, determined by using a Driver Impairment Monitor (DIMON) or other algorithm.

Additionally, a "stranded" alert can be sent if a fuel level is low or zero, tire pressure is low or zero, engine has a shutdown trouble code associated therewith, engine temps are extremely high, etc. and the vehicle is not moving.

Further considerations before sending a stranded alert may include a determination that multiple unsuccessful attempts have been made to start a vehicle. Additionally, the system may check the vehicle GPS coordinates to determine that the vehicle is not at home or in a parking lot, etc.

Seatbelt alerts may also be sent to parents of teen drivers, or even to drivers themselves if a certain distance is traveled without a seatbelt being fastened.

Another example of possible monitoring of an active vehicle could be a highjack alert, wherein a cabin microphone detects the utterance of a certain phrase, and notifies emergency contacts and/or the police that a vehicle occupant may be hijacked. This could be followed up by a responsive notice to the vehicle occupant that a highjacking has been detected and the vehicle is now being tracked using GPS. Of course, it may be desirable not to notify the occupants, so that the kidnappers aren't notified to take evasive action by leaving the vehicle and taking the hostage with them.

In addition to or in alternative, a certain button press combination (of door locks, windows, etc.) could be detected to inform of a hijack situation.

Finally, in still a further illustrative embodiment, a curfew alarm may be provided, that notifies a user if a vehicle is being driven after an established curfew.

Any and all of these monitoring conditions do not necessarily need to be tied to a "valet" or "teen driver" mode, they can all be generally provided for any driver if desired.

Figure 10:
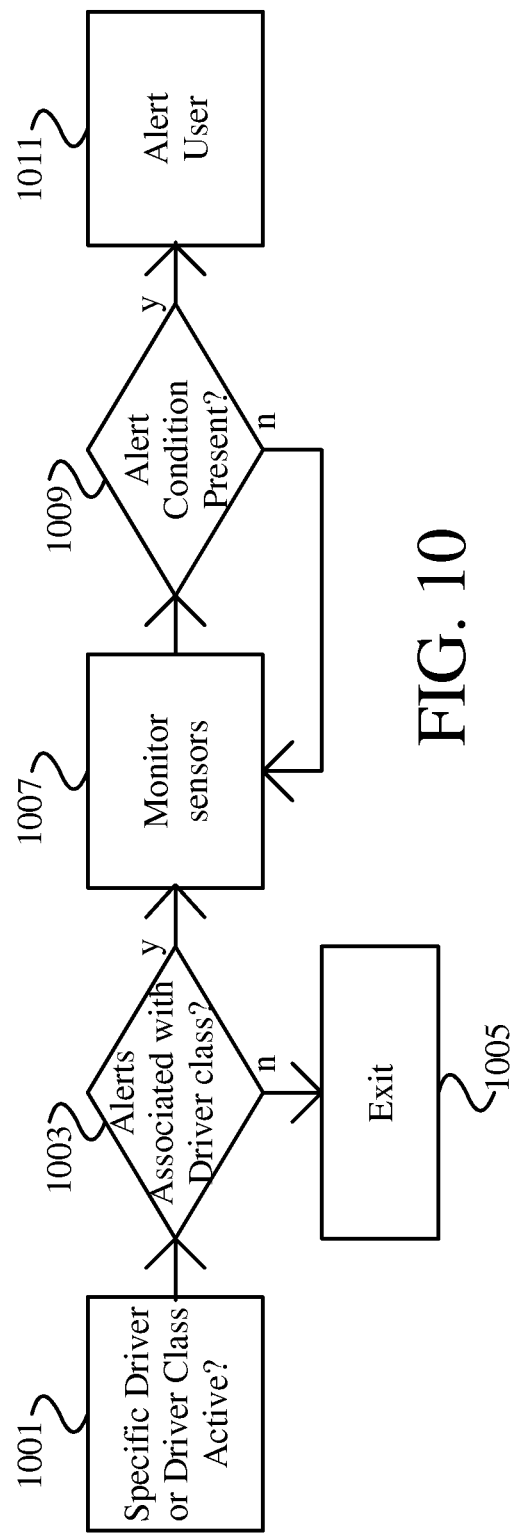
FIG. 10 shows an illustrative example of providing monitoring conditions for a specific driver or set of drivers.

FIG. 10 shows an illustrative example of providing monitoring conditions for a specific driver or set of drivers.

In this illustrative embodiment, the system checks to see if a specific driver or a specific driver class is active 1001. As previously mentioned, this could be a "valet" setting, or could be, for example, activation of the vehicle by a certain key given to a specific driver (such as a teenager).

The system then checks to determine if there are any specific alerts associated with that particular driver or driver class 1003. These can include, but are not limited to, the alerts mentioned above.

If there are no specific alerts, the system may exit 1005. If specific alerts are associated, the system monitors one or more sensors associated with those alerts 1007. If an alert condition is present 1009, the system alerts a user 1011 of the existence of the condition. Otherwise, the system returns to monitoring the sensors 1007.

In yet another illustrative embodiment, GPS tracking can be used to determine, for example, a towing instance. If the GPS coordinates of the vehicle change and the vehicle has not been started, then it's likely the vehicle is being towed, and an owner can be alerted. If the customer is notified of the vehicle movement and it is unlikely that a tow event has occurred, the customer could be given the option to notify 911 via the vehicle system as well, and the GPS coordinates of the vehicle could be tracked.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
   a processor configured to:
   determine that a vehicle has stopped moving;
   determine that an anomalous vehicle condition exists;
   determine if vehicle GPS coordinates correspond to a business or other point of interest; and
   send an alert to a remote party if the vehicle has stopped moving, the anomalous condition exists and the vehicle GPS coordinates do not correspond to a business or other point of interest.

2. The system of claim 1, wherein the anomalous vehicle condition is a fuel-empty condition.

3. The system of claim 1, wherein the anomalous vehicle condition is a vehicle over-heated condition.

4. The system of claim 1, wherein the anomalous vehicle condition is a flat tire condition.

5. The system of claim 1, wherein the anomalous vehicle condition includes the presence of a diagnostic trouble code generated by the vehicle.

6. The system of claim 1, wherein the other known location is a vehicle home address.

7. A computer-implemented method comprising:
   determining that a vehicle has stopped moving;
   determining that an anomalous vehicle condition exists;
   determining if vehicle GPS coordinates correspond to a business or other point of interest; and
   sending an alert to a remote party if the vehicle has stopped moving, the anomalous condition exists and the vehicle GPS coordinates do not correspond to a business or other point of interest.

8. The method of claim 7, wherein the anomalous vehicle condition is a fuel-empty condition.

9. The method of claim 7, wherein the anomalous vehicle condition is a vehicle over-heated condition.

10. The method of claim 7, wherein the anomalous vehicle condition is a flat tire condition.

11. The method of claim 7, wherein the anomalous vehicle condition includes the presence of a diagnostic trouble code generated by the vehicle.

12. The method of claim 7, wherein the other known location is a vehicle home address.

13. A non-transitory computer readable storage medium, storing instructions that, when executed by a processor, cause the processor to perform a method comprising:
   determining that a vehicle has stopped moving;
   determining that an anomalous vehicle condition exists;
   determining if vehicle GPS coordinates correspond to a business or other point of interest; and
   sending an alert to a remote party if the vehicle has stopped moving, the anomalous condition exists and the vehicle GPS coordinates do not correspond to a business or other point of interest.

14. The storage medium of claim 13, wherein the anomalous vehicle condition is a fuel-empty condition.

15. The storage medium of claim 13, wherein the anomalous vehicle condition is a vehicle over-heated condition.

16. The storage medium of claim 13, wherein the anomalous vehicle condition is a flat tire condition.

17. The storage medium of claim 13, wherein the anomalous vehicle condition includes the presence of a diagnostic trouble code generated by the vehicle.

18. The storage medium of claim 13, wherein the other known location is a vehicle home address.

* * * * *